Oct. 7, 1958  J. M. EASTMAN  2,855,029
ALL-SPEED GOVERNOR FOR GAS TURBINE ENGINES
Filed Dec. 26, 1951  2 Sheets-Sheet 2

INVENTOR.
JAMES M. EASTMAN
BY
ATTORNEY

United States Patent Office 2,855,029
Patented Oct. 7, 1958

2,855,029

ALL-SPEED GOVERNOR FOR GAS TURBINE ENGINES

James M. Eastman, South Bend, Ind., assignor to Bendix Aviation Corporation, South Bend, Ind., a corporation of Delaware Application December 26, 1951, Serial No. 263,266

15 Claims. (Cl. 158—36)

It is common practice to utilize a centrifugal governor of the mechanical fly-weight type to control a fuel metering or throttle valve in fuel control systems for gas turbine engines, the governor including a governor spring which is manually adjustable or capable of being reset by a pilot to accelerate and decelerate to selected speeds, at which point the speed is automatically maintained substantially constant due to the fly-weight force tending to balance the governor spring force. In recent years, a fuel control system for gas turbine engines, and particularly for jet engines as used in aircraft, has been adopted by various engines companies wherein the area of a metering restriction is controlled by an adjustable all-speed governor while the fuel metering head across the valve is controlled by a fuel regulator which operates as a function of engine speed and the pressure and temperature of the air flowing to the engine. This type of control is described and claimed in certain copending applications of Frank C. Mock (common assignee), among which are Serial Nos. 557,812, filed October 9, 1944; 596,620, filed May 30, 1945; and 716,154, filed December 13, 1946, now Patents Nos. 2,581,275, issued January 1, 1952, 2,581,276, issued January 1, 1952, and 2,689,606, issued September 21, 1954.

The all speed governors used in the foregoing controls have so far been of the so-called proportional type, viz. one wherein for any given deviation in engine speed from an equilibrium setting or operating condition, the throttle valve will open or close proportionally to such deviation in making the fuel flow correction. The action of such a governor is illustrated in Figure 3. Assume that the engine is operating at point 1 and the pilot resets the governor to accelerate from the speed at 1 to a speed at 3. In response to the change from a low speed to a maximum speed setting, the governor valve immediately goes wide open, which accounts for the vertical arrow line to the acceleration limit at point 1'. At the upper temperature or acceleration limit line, the regulator maintains a fuel metering head across the throttle valve which increases only with an increase in engine speed, and fuel flow follows the arrows to point 2, at which point the selected speed is approached and the governor weights start to close the valve and reduce fuel flow. However, since fuel flow at 2 exceeds engine requirements for point 3, the engine continues to accelerate, but at a decreasing rate, as fuel flow is reduced to point 3. At 3 engine speed reaches equilibrium and acceleration stops. While operating at 3, any deviation from the selected or set speed will disturb the balanced condition of the governor and cause a movement of the governor valve and a change in fuel flow substantially proportional to the R. P. M. deviation as indicated by the slope of the line through points 2 and 3. This proportional action tends toward engine or governor stability, since the valve does not go to a fully open or fully closed position whenever a slight deviation from the selected speed occurs and then move back and forth or hunt without reaching equilibrium. This is obviously an advantage. A disadvantage of the proportional governor is that, since it meters fuel according to the sloping line indicated by 2—3, any change in the fuel required to run the engine will result in equilibrium being reached at a different point on this line, and consequently at a different engine speed. Thus, it will not govern as close to the set speed as may be required for certain types of engines.

If the governor should have an isochronous action, it would not cut off or close the throttle valve until point 2' is reached, and the valve would come to rest at point 3 corresponding to the setting of the governor, or at a position, equivalent to a point anywhere on the vertical arrow line through points 2' and 3, where the fuel feed rate produced the selected speed.

An isochronous governor is of advantage in fuel controls for certain types of engines, but due to the characteristic of such a governor viz., its tendency to move quickly to open and closed positions to correct for small deviations from a selected or equilibrium speed, it tends to hunt. Various proposals have heretofore been advanced in efforts to devise a stable isochronous governor, including dashpot damping means, pilot valve arrangements and the like to prevent surging or hunting, but such governors as far as known, while improving stability, were either too complicated or were not adapted for engines having certain characteristics.

The primary object of the present invention is to provide an improved speed governor for engines which combines the advantageous features of the proportional governor and the isochronous governor. Stated in another way, the object is to provide an improved isochronous governor which will promptly respond to changes in governor setting and which at the same time is stable in operation. In attaining this object I provide an arrangement of damping or dashpot means and coacting governor spring means, and preferably utilize therewith governor fly-weights designed to develop an increasingly greater force on the governor valve as they move outwardly, this force characteristic of the fly-weights matching the force build-up of the spring means. The net result is a governor capable of isochronous governing yet having a relatively quick response to changes in setting with stability at the equilibrium condition.

Other and more specific objects and advantages will become apparent in view of the following description taken in conjunction with the drawings, wherein.

Figure 1:
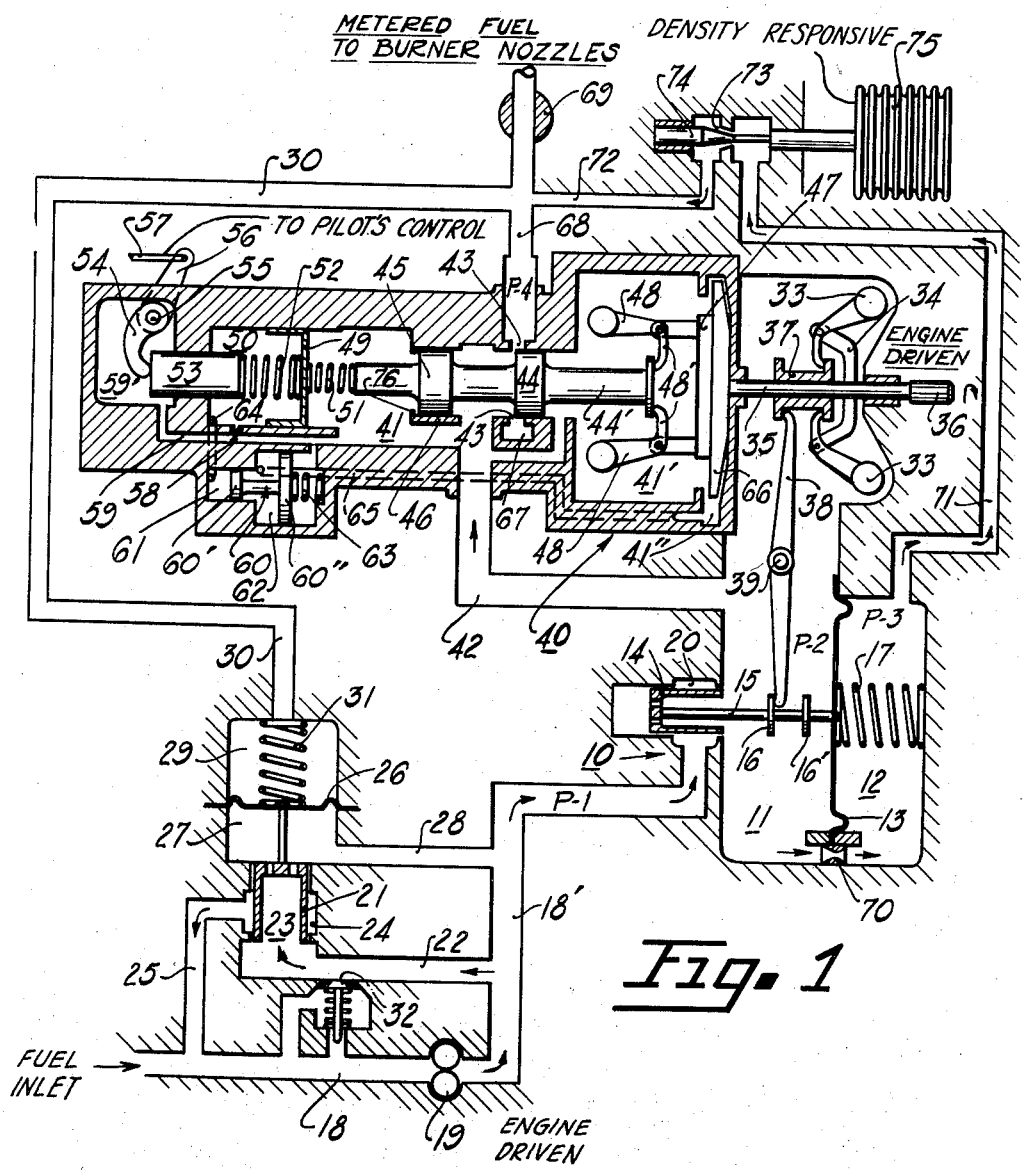
Figure 1 is a schematic sectional view of a fuel control device provided with an all-speed governor in accordance with the invention.

Referring to Figure 1, which illustrates schematically a fuel control system for gas turbine engines of the general type disclosed in the Mock patents heretofore noted, a regulator section or body is indicated at 10 which is divided into a pair of chambers 11 and 12 by a diaphragm 13. A regulator valve 14 is connected to the diaphragm by means of a stem 15, carrying lever-engaging members shown in the form of collars 16, 16' for a purpose to be described. A spring 17 is mounted in chamber 12 and at its inner end bears against the diaphragm 13; it functions as a minimum head regulator in that it determines the minimum value of the metering head at engine speeds which may be so low as to otherwise result in instability of the regulator, as during the starting period.

Fuel is supplied under pressure to the regulator by way of conduit 18, 18', having mounted therein suitable fuel pressurizing means such as an engine driven fuel pump 19, the conduit 18' terminating in an annular valve chamber 20. The supply (P1) pressure is maintained at a predetermined value over and above metered fuel (P4) pressure by means of a by-pass valve 21, which controls the return flow of fuel from conduit 18' by way of conduit 22 and valve chamber 23 to annular chamber 24 and conduit 25 back to conduit 18, or back to the low pressure side of pump 19. Valve 21 has its stem connected to a diaphragm 26, having on one side thereof a chamber 27, which is vented to supply or P1 pressure by conduit 28, and on its opposite side a chamber 29, which is vented to metered fuel or P4 pressure by way of passage 30. The fuel supply pressure will therefore be maintained at a substantially constant value above metered fuel or nozzle discharge pressure as determined by the force of spring 31.

A safety or maximum pressure relief valve is indicated at 32; it is designed to prevent dangerous pessures in the system due, for example, to the flow of fuel to the burners being suddenly cut off while the engine is running.

A pair of so-called speed metering weights are indicated at 33; they constitute speed sensing means and are pivotally mounted on a bracket 34, secured to and rotatable with an engine driven shaft 35, provided with a drive pinion of spline 36. The weights 33 are operatively connected to the regulator valve 14 by means of a slide bearing 37, having flanged ends, one end flange being engaged by the foot or lever portions of the said weights and the other or opposite end flange engaging the upper end of a lever 38, pivoted or fulcrumed at 39 and at its lower end engaging the member 16 secured on the stem of the said valve.

When the shaft 35 is rotated in relation to engine speed, the weights 33, acting through lever 38, member 16 and valve stem 15, exert a force proportional to the square of engine speed in a direction tending to open the valve 14. As this valve opens, the pressure of fuel in chamber 11 increases and exerts a force on diaphragm 13 tending to close said valve. At a given engine speed (also at a given air intake pressure and temperature as will subsequently appear) the opposing forces are in balance and valve 14 remains at a given position. Neglecting the force exerted by spring 17, the effect of which becomes negligible in the higher speed ranges when the engine is running, the differential across diaphragm 13 is proportional to the square of engine speed, and hence the regulator will always tend to establish a metering head or differential across a metering orifice proportional to the square of engine speed, thereby causing flow to vary in proportion to engine speed directly.

A control section or body is indicated at 40; it defines chambers 41 and 41', to which fuel flows from the regulator chamber 11 at P2 pressure by way of passage 42. In these chambers are the all-speed governor valve, governor weights and associated parts which constitute the principal features of the instant invention.

A metering orifice or restriction is indicated at 43, the area of which is controlled by a throttle or governor valve 44, carried by a valve body 44'. A guide land 45 is also formed on said body and has sliding movement in a guide cylinder 46. The engine driven shaft 35 is provided with a disc 47, and pivotally mounted thereon is a pair of governor weights 48, having foot or lever portions 48' engaging the adjacent end or bearing surface of the valve body 44'. At the opposite end of the valve body is a coacting dashpot and spring assembly comprising a piston 49, slidable in a dashpot cylinder or chamber 50. A pair of governor springs 51 and 52 have their adjacent ends abutting the opposite sides of the piston 49, the opposite end of spring 51 engaging the adjacent end of valve body 44' and the opposite end of spring 52 engaging a governor-setting member in the form of a slidable piston 53. The piston 53 is engaged by the free end of a lever 54, secured on a shaft 55, the latter projecting beyond the control body and carrying an arm 56, which may be connected to a pilot's control member or quadrant by link 57. A calibrated orifice or bleed 58 is located in the wall of the dashpot chamber 50. The spring 51 is relatively stiff as compared to spring 52, the purpose of which, together with the effective displacement of dashpot piston 53 and other characteristics of the governor, are set forth in the description of operation. A passage 59 communicates chambers 41 and 59', so that piston 53 may be freely displaced to the right without creating a vacuum in chamber 59'.

What may appropriately be termed an anticipator piston is indicated at 60; it is provided with pistons 60' and 60" of different effective areas, slidably mounted in chambers or cylinders 61 and 62 against the resistance of a calibrated spring 63. A passage 64 communicates piston chamber 61 with the dashpot chamber 50, and another passage 65 communicates impeller discharge chamber 41" with chamber 62. An impeller 66 is mounted for rotation with shaft 35 in chamber 41".

It will be seen that when impeller 66 rotates in chamber 41", a pressure difference is generated between chambers 41 and 41" which varies with the speed of rotation of the impeller and hence with engine speed. Such variable pressure is communicated to chamber 62 and effects movement of piston 60', which movement also effects movement of dashpot piston 49, in a manner and for a purpose set forth in the description of operation. Since the flyweights 48, spinning in chamber 41', also act as an impeller, for certain installations the impeller 66 could be omitted by connecting chamber 62 with chamber 41', provided a sufficient pressure difference is obtained between 41 and 41'.

The metering orifice 43 feeds into annular chamber 67 and metered fuel passage 68 (see Fig. 1), the latter having a shut-off valve 69 therein. Passage 68 leads to the fuel manifold and burner nozzles of a gas turbine engine, not shown.

There remains to be described the density compensating circuit. It consists of a control bleed 70 across diaphragm 13, passages 71, 72 communicating chamber 12 (P3 pressure) with metered fuel conduit 68 and having a variable orifice 73 therein. A contoured needle valve 74 controls said orifice and is connected to the movable end of an aneroid or spring-loaded bellows 75, responsive to changes in pressure and/or temperature of the air flowing to the engine. The essentials of the density circuit constitutes the subject matter of a copending application of Frank C Mock (common assignee), Serial No. 620,755, filed October 6, 1945, now Patent No. 2,644,513, and in itself forms no part of the present invention. However, it constitutes part of the fuel control device of Figure 1 and its operation will be briefly described in connection therewith.

*Operation of control with governor*

In starting a gas turbine engine, suitable cranking means may be utilized to spin the turbine and compressor while at the same time fuel is fed to the burners and ignited and cranking continued until the engine attains a self-sustaining speed. Purely for the purposes of illustration, let it be assumed that in the position of the respective parts as shown schematically in Figure 1, the engine is operating at a low or idle speed at ground level. Fuel flows to the regulator valve 14 by way of conduit 18' at P1 pressure as determined by the setting of the by-pass valve spring 31, then across the regulator valve to chamber 11. Here the fuel is at regulated or P2 pressure, and from chamber 11 it flows by way of passage 42 into chamber 41 (also into flyweight chamber 41') and thence through metering orifice or restriction 43 to annular chamber 67 and metered fuel passage 68, from which it feeds to the burner nozzles of the engine. A limited quantity of fuel will also flow across diaphragm 13 by way of bleed 70 into chamber 12 and thence by way of passage 71, variable orifice 73 and passage 72 to metered fuel conduit 68, this flow (density compensating or P3 pressure) by-passing the governor valve 44.

The governor valve 44 is the prime control of fuel to the engine; it is positioned by the pilot, through link 57, arm 56, lever 54, pistons 53 and 49, and springs 51 and 52 in selecting or resetting the governor to the desired engine speed. For every power or pilot's control lever position assuming a fixed governor valve position, there is a definite force set up by coacting governor springs 51 and 52 tending to open the throttle valve 44, and for every engine speed there is a definite thrust force set up by the governor weights 48 tending to close said valve. When the pilot resets his control lever, there will follow a transition in engine speed, at the termination of which the valve 44 will automatically seek a position of equilibrium, at which time the thrust force of the governor weights equals the force of the springs 51 and 52, and fuel is metered at a rate tending to maintain engine speed constant.

Movement of the valve 44 in a direction causing an increase in the area of the metering restriction 43 (resetting of the governor to accelerate) results in (1) a sudden sharp increase in the rate of fuel feed to the engine, and (2) a momentary decrease in the drop across said valve and a corresponding decrease in pressure in chamber 11, which latter pressure opposes the thrust of the speed sensing weights 33. The regulator now becomes unbalanced or out of phase with engine speed and valve 14 immediately moves toward open position and quickly increases fuel flow into chamber 11 and builds up P2 pressure to a point where the fuel head across the regulator diaphragm again balances the thrust exerted by the centrifugal weights 33 (fuel head in phase with engine speed). The vertical arrow line in Figure 3 from 1 to 1' represents the sudden increase in the rate of fuel feed which follows the opening of the throttle valve and remains in effect during the out-of-phase condition of the regulator. At 1' the regulator is in balance, and from this point until governor cut-off at 2' (or 2), the head across the increased throttle valve area increases with engine speed. Movement of the throttle valve in a direction to restrict fuel flow (resetting of the governor to decelerate) results in a sudden decrease in the rate of fuel feed and an increase in drop across said valve and a momentary increase in P2 pressure in chamber 11, whereupon the regulator valve takes up a reduced flow position to again bring the regulator in balance, and fuel flow, or more specifically the fuel head, decreases with engine speed back to the new governor valve setting.

Since less fuel is required to maintain the engine at a given speed as altitude is gained, or upon a decrease in pressure and/or an increase in temperature, the density circuit is provided to automatically regulate the fuel head as a function of these parameters. Normally, the needle 74 never completely closes the orifice 73 but simply varies the effective area thereof. It will be seen that starting with chamber 11, passage 42, governor chamber 41, metering orifices 43 and chamber 67 (the main flow circuit) constitute one flow passage terminating in metered fuel conduit 68, and that bleed 70, chamber 12, passage 71, variable orifice 73 and passage 72 constitute another flow passage (the density circuit) in parallel with said first-named flow passage; and since the pressures at opposite ends of said passages are equal or common with respect to both, the pressure drop across the respective passage will be equal at a given engine speed and entering air pressure and/or temperature. Also, as heretofore noted, the fuel pressure differential across the diaphragm 13 will vary with variations in engine speed, and hence the differential across the density control circuit will vary with variations in speed. All flow through the density circuit must pass through the orifice 73 which is in series with the jet or bleed 70. Should there be a change in the position of the needle 74, the effective area of orifice 73 will be varied and this will momentarily vary the P2—P3 differential across diaphragm 13, or upset the force balance or in-phase condition of the regulator, whereupon the regulator valve 14 will take up a new position and the fuel head and hence rate of fuel feed will either increase or decrease to a point where the P2—P3 differential is again in balance with the thrust produced by the centrifugal weights 33.

*Structural characteristics and operation of governor*

Under conditions of governing during which the dashpot piston 49 has a floating action, viz., it will move back and forth in response to valve movement, it assumes a position where the loads on the springs 51 and 52 are in balance, or each is opposing closing movement of valve 44 with the same effective force. Under such conditions, viz., floating action of piston 49, the said springs act in combination and the over-all effective combined stiffness or spring rate is less than that of either of springs 51 or 52 acting alone. As heretofore noted, the governor weights 48 are preferably designed to develop an increasingly greater force as they move outwardly (also the stroke of the governor valve 44 is preferably reduced), and by proper selection of spring 52, the force build-up exerted by the springs acting in combination may be made to exactly compensate the opposing force build-up of said weights, such that at a fixed engine speed, the governor valve may be in balance at any position in its travel range.

The effective size or area of piston 53 influences the ability of piston 49 to move in response to a change in setting of the governor. To prevent the dashpot action from delaying a change in setting of spring 51, the effective area of piston 53 is selected so that when it is moved sufficiently to make the required setting change, it displaces an amount of fuel or hydraulic fluid equal to that required to move piston 49 a distance to properly reset spring 51. Since spring 51 is relatively stiff, piston 49 needs to move only a fraction of the distance traveled by piston 53 to produce a given setting change. Hence piston 53 is of smaller effective area than piston 49 so that the same amount of fuel will be displaced by each. With such an arrangement, setting changes can be made without producing a substantial flow through bleed 58, and consequently the loads of springs 51 and 52, though changed, remain in balance.

The effective area of bleed 58 is selected to permit the desired dashpot action of piston 49 in effecting a balanced conditions of springs 51 and 52. Preferably it is of a size which will resist displacement of said piston in response to rapid changes in governor or fly-weight force and correspondingly rapid changes in valve position and the force of spring 51. When ultimate equilibrium is reached, piston 49 must be in a position where the forces exerted by springs 51 and 52 are in balance. For any other position of piston 49, it is moving towards its equilibrium position with a speed approximately proportional to the difference in loading of springs 51 and 52. Such load difference generates the pressure differential across bleed 58, and in conjunction with the size of bleed 58, determines the rate of flow into or out of dashpot chamber 50.

The anticipator piston 60 may or may not be found necessary; its purpose is to prevent objectionable overshoot when accelerating quickly from a low to a high speed setting in a manner set forth in the following description of governor operation. The behavior without the anticipator piston will first be examined.

Figure 2:
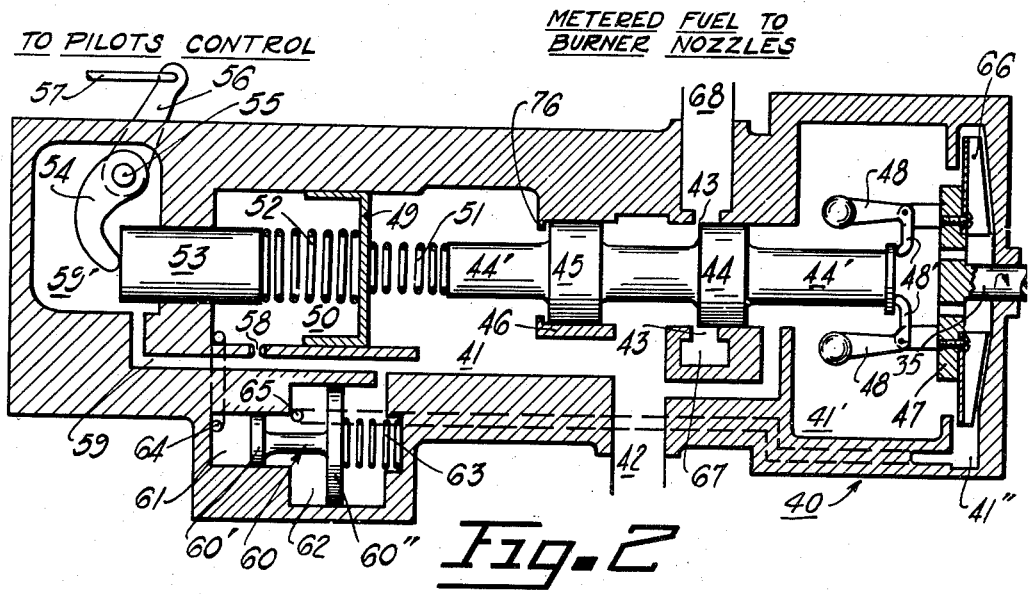
Figure 2 is a similar view of the governor but enlarged to show the parts more clearly.
Figure 3:
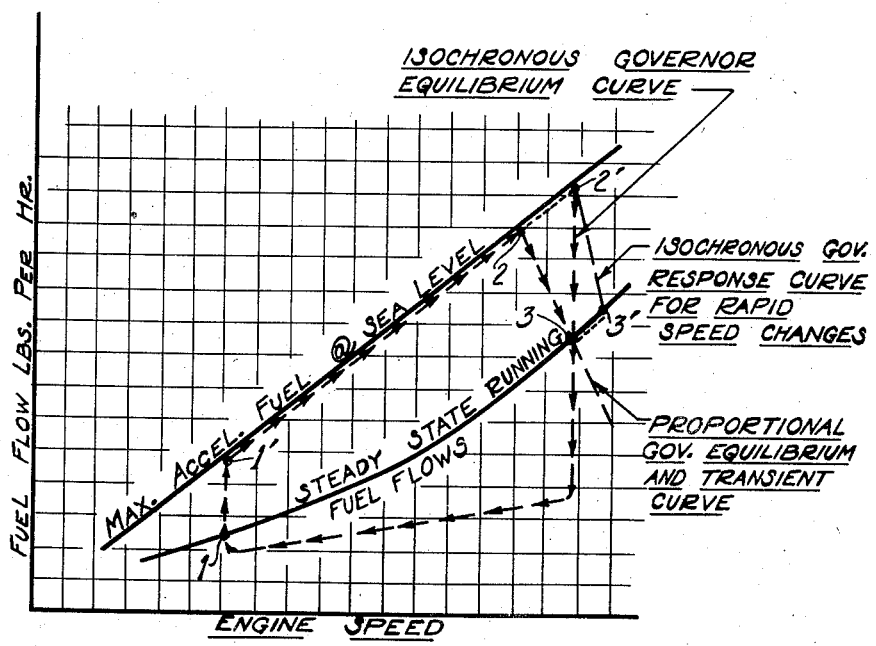
Figure 3 is a curve chart, illustrating the operational characteristics of the governor when installed in a control of the type shown in Figure 1.

Let it be assumed that in the position of the parts as shown in Figure 2, the engine is running at a relatively low speed, for example at 1 on the steady speed curve of Figure 3. At any point along this curve the governor tends to establish a rate of fuel feed which will produce a selected engine speed.

If now the pilot desires to accelerate from point 1 to point 3, he rotates lever 54 counterclockwise and depresses or moves piston 53 inwardly or to the right, building up pressure in dashpot chamber 50, causing piston 49 to also move to the right and simultaneously compress springs 51 and 52, whereupon governor valve 44 moves wide open and swings the governor weights 48 further inwardly. Since fuel is free to flow from chamber 41 to chamber 59' by way of passage 59, piston 49 will move with sufficient rapidity to effect prompt opening of valve 44 for acceleration. Fuel flow now increases suddenly to 1', Figure 3, where the fuel head regulator takes over and the rate of fuel feed increases along the upper temperature or maximum acceleration fuel line to point 2. During this transition in speed, the valve 44 remains open while the fly-weight force build-up acting counter to spring 51 increases, until at 2' it begins to overcome the force of spring 51 and starts closing the valve 44. This closing action of the valve causes stiff spring 51 to be compressed, and occurs too rapidly to permit the dashpot piston 49 to move appreciably. Consequently, the flyweights 48 are opposed essentially only by the stiff spring 51 and require an increasing speed with resultant force build-up to cause the governor valve to move in the closing direction. This is indicated by speed overshoot to the point 3'. At 3' the fuel flow has been reduced to the steady state requirement and engine acceleration stops. When the point 3' is reached, spring 51 has been compressed, resulting in an unbalance in the spring loads on dashpot piston 49. Consequently, the piston 49 gradually moves to the left, lowering the force on spring 51 and valve 44 and permitting the fuel flow and speed to come to the point 3, at which point the loads of springs 51 and 52 are in balance and dashpot motion stops. Any rapid changes in engine speed from point 3 would again be opposed by spring 51, acting alone to cause the fuel flow to follow a sloping curve essentially parallel to 2'—3' or 2—3. This would be followed by motion of dashpot piston 49 to return the speed to the set value. Thus the response to rapid speed changes is essentially the same as for a proportional governor but is always followed by dashpot action to restore the speed to the set value.

The purpose of the anticipator piston 60 is to eliminate the overshoot between points 2' and 3'. The aim is to provide a temporary reset to the governor setting to cause the governor valve to break early (as at point 2 for the proportional governor) and to remove this resetting effect by the time point 3 is reached (in the manner previously described for point 3') so that equilibrium then exists at point 3. The anticipator action chosen applies a governor resetting action essentially proportional to the rate of engine acceleration and consequently becomes zero when acceleration stops at point 3. The anticipator operates as follows: Impeller 66, generates a hydraulic force in chamber 62 which increases with an increase in speed, until it overcomes the small initial force of spring 63 and pistons 60', 60" move to the right and fuel is drawn out of dashpot chamber 50. The rate of travel of piston 60' and 60" is substantially proportional to the rate of engine acceleration and therefore tends to draw fuel from chamber 50 at a rate also substantially proportional to the rate of acceleration. This sets up a pressure drop across bleed 58 which affects piston 49 as a force tending to move it in a direction to produce a lower governor setting on spring 51 than that actually set by the pilot. By proper correlation of the sizes of pistons 60', 49 and 60", the rates of springs 63, 51 and 52 and the size of bleed 58, the desired anticipating effect may be obtained. Thus at point 2 in Figure 3, the governor valve 44 starts cutting off. The anticipator has (by drawing piston 49 to the left) caused the load on spring 52 to exceed the load on spring 51. Between points 2 and 3, the dashpot piston 49 is substantially stationary and spring 51 is compressed. At point 3 acceleration stops and the anticipator force is relaxed, whereupon an equilibrium condition is attained with the load build-up on spring 51 bringing its load in balance with that of spring 52.

Considering now operation at equilibrium, the dashpot piston 49 resists any tendency toward sudden movement in either direction, as heretofore noted, assuming piston 53 at a given position. Thus, should the engine tend to speed up due, for example, to a reduction in external load at a given setting of lever 54, piston 53 will be held against outward movement by said lever and the dashpot piston will resist movement toward the left, as viewed in Figure 2; and should the engine tend to slow down due to an increase in external load, piston 53 will remain substantially stationary or be held against inward movement due to the action of spring 52, which though slightly extended, will still urge piston 53 against lever 54. Hence, any sudden tendency toward deviation from the set speed at equilibrium will be corrected by the relatively stiff spring 51, followed by what may be considered a vernier resetting by both springs 51 and 52. This results in isochronous governing and at the same time avoids hunting which might otherwise occur should valve 44 go wide open or fully closed to correct fuel flow in response to sudden small speed deviations. Here, the primary action is that of a proportional governor followed by a secondary action in the nature of an isochronous governor.

If at equilibrium the speed deviations should be more gradual, bleed 58 permits fuel to flow in or out of dashpot chamber 50 and piston 49 will then move and maintain springs 51 and 52 in balance. Under such conditions, the response of valve 44 is as though it had a relatively soft setting or governor spring of a stiffness corresponding to the effective stiffness of springs 51 and 52 acting in combination, and the force build-up for a given valve movement is greatly reduced. By proper selection of spring 52, such force build-up for equilibrium may be made to exactly compensate the force build-up characteristic of the governor weights 48, thus resulting in an isochronous governor action (a vertical governor break curve back to the steady state running curve of Figure 3).

Deceleration or reduced speed settings are had by rotating or resetting lever 54 clockwise. The governor weights then move valve 44 to a closed position or to some minimum effective opening, depending upon the degree of speed reduction. Assuming it is desired to throttle from speed 3 of Figure 3 back to point 1, then the valve 44 would go up against its minimum flow stop 76 and fuel feed would decrease sharply until the minimum head established by the regulator took effect, whereupon engine speed would decrease with a decrease in flow until point 1 is approached. During this transition in speed, the fuel pressure in anticipator chamber 62 is being reduced and spring 63 moves piston 60' to the left and builds up the pressure in chamber 50. This establishes a momentary governor setting slightly greater than that set by lever 54, so that valve 44 starts to cut off before the set speed is attained and finally settles at 1 on the steady speed curve.

Although only one embodiment of the invention has been schematically illustrated and described, various changes in form and relative arrangement of parts may be made to suit individual requirements.

I claim:

1. In an adjustable speed governing system for an engine, means providing a fuel metering restriction, a governor valve controlling said restriction, a rotatable governor element operatively connected to said valve, a pair of governor springs operatively connected to said valve, means for resetting said springs to select an operating speed for the engine, and means for effecting a force balance between said springs during equilibrium operation of the governing system.

2. In an adjustable speed governing system for an engine, means providing a fuel metering restriction, a governor valve for controlling said restriction, a rotatable governor element operatively connected to said valve, a pair of governor springs operatively connected to said valve, means for resetting said springs to select an operating speed for the engine, and means for effecting a force balance between said springs for operation during equilibrium and for unbalancing the forces of said springs in response to governor cut-off action as the valve approaches equilibrium following resetting of said governor.

3. In a speed governing system for an engine, means providing an adjustable speed governor including a fuel metering restriction, a governor valve for controlling the area of said restriction, a rotatable governor element operatively connected to said valve, movable wall means and associated springs providing governor spring means, and flow control means for causing said movable wall means to resist movement in response to governor cut-off action as the valve approaches equilibrium following a resetting of said governor and for effecting a force balance between said springs during equilibrium operation of the governor.

4. In an adjustable speed governing system for an engine, means providing a restriction, a valve for varying the area of said restriction, a rotatable governor element operatively connected to said valve, coacting governor springs, a dashpot chamber, a movable wall means coacting with said springs and with said chamber, means adapted to move the movable wall means with said springs during adjustment of said governor, means operatively connected to said movable wall means which permits said movable wall means to establish a force balance between said springs during equilibrium operation of the governing system and which effects a variation in the dashpot chamber pressure as the governor approaches an equilibrium position.

5. In a speed governing system for an engine, a fuel conduit for delivering fuel to the engine, a fuel metering restriction in said conduit, a valve controlling said restriction, one or more centrifugal governor weights operatively connected to said valve, a pair of governor springs operatively connected to said valve, movable means coacting with said springs so that during rapid valve movement one of said springs is restrained in its action while the other of said springs acts substantially alone to oppose valve motion and so that during operation at equilibrium the rates of said springs are combined such that the effective spring rate opposing movement of said valve is less than the spring rate of either of said springs acting alone, said governor weights having a characteristic such that as said weights move outwardly at any given constant engine speed the governor weight force increases at substantially the same rate that the spring force due to the combined effective spring rate increases.

6. In a speed governing system for an engine, means providing a restriction, a valve for varying the area of said restriction, governor means for controlling said valve including one or more centrifugal governor weights operatively connected to said valve, a pair of governor springs opposing movement of said valve toward closed position, movable means operatively interposed between said springs and means for resisting sudden changes in the length of one of said springs as the valve approaches equilibrium, said movable means being adapted to effect a force balance between said springs as the valve settles on equilibrium so that the effective spring rate opposing valve movement is less than the rate of either of said springs and said governor weights having such a characteristic that the force output thereof increases at a constant engine speed as said weights move in a valve closing direction so as to substantially balance the spring force increase on the valve due to said effective spring rate, and means operatively connected to said movable means for displacing said movable means at a rate determined by the rate of engine acceleration, whereby said governor means is temporarily reset during acceleration of the engine.

7. In a speed governing system for an engine, means providing a restriction, a valve for varying the area of said restriction, a rotatable governor element operatively connected to said valve, first movable wall means, an expansible chamber defined by said movable wall means, opposing spring means operatively connected to said movable wall means and arranged to oppose a closing movement of said valve, means for resetting said governor including said movable wall means and means providing displacement of hydraulic fluid in said chamber in response to changes in setting of said governor, an orifice adapted to communicate said chamber with a source of hydraulic fluid for resisting a sudden change in length of one of said springs in response to sudden changes in speed of the engine at a given setting of said governor, means for generating a hydraulic pressure which varies as a function of engine speed, and second movable wall means hydraulically connected to said chamber and to said last mentioned means, said second movable wall means being positionable as a function of said generated pressure such that movement of said second movable wall means repositions said first movable wall means to produce a temporary change in the setting of said governor.

8. In a speed governing system for an engine, a fuel restriction, fuel valve means controlling said restriction, at least one centrifugal governor element operatively connected to said valve means, a pair of governor springs operatively connected to said valve means, means coacting with said springs for combining the rates thereof during equilibrium operation of the engine, said governor element having such a characteristic that the force output thereof increases at a predetermined rate as the element flies outwardly at any constant engine speed, said force increase being substantially equal to the spring force increase which results from said combined spring rate, whereby said fuel valve means varies said restriction in such a manner that isochronous governing of the engine is essentially attained.

9. In a speed governing system for an engine, a fuel metering restriction, a valve controlling said restriction, a rotatable governor element operatively connected to said valve, a pair of governor springs operatively connected to said valve, means for resetting the governor to various selected engine speeds including said springs, an engine speed anticipating means coacting with said governor resetting means following a resetting of said governor to a selected speed and movable to determine the speed at which said governor begins to govern the engine as a function of the rate of acceleration of the engine.

10. In a speed governing system for an engine, a resettable governor including valve means, a rotatable governor element operatively connected to said valve means, a pair of governor springs for opposing movement of said valve means toward closed position, movable wall means operatively connected to both of said springs, operator controlled means effecting movement of said movable wall means in response to a resetting of said governor, and means for resisting a change in the length of one of said springs so as to effectively utilize only the other of said springs as the valve approaches equilibrium, said movable wall means moving to effect a force balance between said springs as the valve settles on equilibrium so that the effective spring rate opposing motion of said valve means is then less than the rate of either of said springs.

11. In a speed governing system for an engine, a resettable governor including valve means, at least one centrifugal governor weight operatively connected to said valve means, a pair of governor springs opposing movement of said valve means toward closed position, movable wall means operatively connected to both of said springs, power control means for effecting movement of said movable wall means in response to a resetting of said governor, and means for resisting sudden changes in the length of one of said springs so as to utilize only the other of said springs as said valve means approaches equilibrium, said movable wall means becoming movable to effect a force balance between said springs as the valve means reaches equilibrium so that the effective spring rate opposing valve movement is then less than the rate of either of said springs, and said governor weight having such a characteristic that the weight force increases as said weight flies outwardly at a constant engine speed so as to substantially equal the spring force increase on the valve means due to said effective spring rate at any position of said valve means throughout its range of travel.

12. In a speed governing system for an engine, valve means, governor means for controlling said valve means including at least one centrifugal governor element operatively connected to said valve means, a pair of governor springs opposing movement of said valve means toward closed position, movable means operatively connected to both of said springs and means for resisting a change in the length of one of said springs as the valve means approaches equilibrium, said movable means being adapted to effect a force balance between said springs as the valve reaches equilibrium so that the effective spring rate opposing valve movement is then less than the rate of either of said springs and said governor element having such a characteristic that the force output thereof increases at a constant engine speed as said element moves in a valve closing direction so as to substantially balance the spring force increase on the valve means due to said effective spring rate, and means operatively connected to said movable means for displacing said movable means as a function of the rate of engine acceleration.

13. In a speed governing system for an engine, valve means, a rotatable governor element operatively connected to said valve means, movable wall means, an expansible chamber defined by said movable wall means, opposing spring means operatively connected to said movable wall means and arranged to oppose the closing movement of said valve means, an orifice adapted to communicate said chamber with a source of hydraulic fluid for resisting a sudden change in length of one of said springs during governor cut-off action, means for generating a force which varies as a function of engine speed, and means operatively connected to said chamber and to said force generating means for repositioning said movable wall means during an acceleration of the engine to produce a temporary change in the setting of said governor.

14. In a speed governing system for an engine, a fuel metering restriction, a governor valve for varying the area of said restriction, a centrifugal governor element operatively connected to said valve, and means for resetting the governor to select an operating speed for the engine including a dashpot and governor spring means operatively connected to said valve, and means for effectively nullifying dashpot action during a resetting of the governor to accelerate the engine.

15. In a speed governing system for an engine, a fuel metering restriction, a governor valve for varying the area of said restriction, a centrifugal governor element operatively connected to said valve, and means for resetting the governor to select an operating speed for the engine including a dashpot having an expansible fluid chamber, governor spring means coacting with said dashpot and operatively connected to said valve, and means for displacing the fluid in said chamber in response to a change in setting of the governor in such a manner that the action of said dashpot is effectively nullified.

References Cited in the file of this patent

UNITED STATES PATENTS

| | | |
|---|---|---|
| 2,375,411 | Grant | May 8, 1945 |
| 2,515,074 | Bobier | July 11, 1950 |
| 2,560,118 | Malone et al. | July 10, 1951 |
| 2,576,352 | Neal | Nov. 27, 1951 |
| 2,612,944 | Orr | Oct. 7, 1952 |
| 2,657,918 | Parker | Nov. 3, 1953 |